(12) United States Patent
Kawashima et al.

(10) Patent No.: US 12,434,316 B2
(45) Date of Patent: Oct. 7, 2025

(54) SOLDERING APPARATUS

(71) Applicant: SENJU METAL INDUSTRY CO., LTD., Tokyo (JP)

(72) Inventors: Yasuji Kawashima, Osaka (JP); Hiroshi Taguchi, Tokyo (JP); Kyoko Kuramoto, Tokyo (JP); Henri Hanzawa, Tokyo (JP); Tomotake Kagaya, Tokyo (JP); Katsuhiro Shinohara, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/874,560

(22) PCT Filed: Jun. 12, 2023

(86) PCT No.: PCT/JP2023/021650
§ 371 (c)(1),
(2) Date: Dec. 12, 2024

(87) PCT Pub. No.: WO2023/243576
PCT Pub. Date: Dec. 21, 2023

(65) Prior Publication Data
US 2025/0162053 A1 May 22, 2025

(30) Foreign Application Priority Data
Jun. 13, 2022 (JP) ................. 2022-094829

(51) Int. Cl.
*B23K 3/08* (2006.01)
*B08B 1/12* (2024.01)
*B08B 1/20* (2024.01)

(52) U.S. Cl.
CPC .................. *B23K 3/08* (2013.01); *B08B 1/12* (2024.01); *B08B 1/20* (2024.01)

(58) Field of Classification Search
CPC .............. B23K 3/08; B23K 1/206; B08B 1/20
See application file for complete search history.

(56) References Cited

U.S. PATENT DOCUMENTS 2,857,608 A * 10/1958 Schwartz ............... A63B 57/60
D4/118
6,273,317 B1 8/2001 Arai et al.
(Continued)

FOREIGN PATENT DOCUMENTS

JP  2000151090 A  5/2000
JP  2001001134 A  1/2001
(Continued)

OTHER PUBLICATIONS

Office Action issued on Nov. 6, 2024 for Taiwanese Patent Application No. 112122033. and its English machine translation by Google Translate.
(Continued)

*Primary Examiner* — Shay Karls
(74) *Attorney, Agent, or Firm* — Ladas & Parry, LLP

(57) ABSTRACT

A solder removing mechanism 520 is a solder removing mechanism for removing solder from conveyance claws 510 for conveying a substrate 200 to which the solder is supplied. The solder removing comprise an abutment body 530 that can relatively pass through recesses 511 of the conveyance claws 510 or below the conveyance claws 510.

5 Claims, 8 Drawing Sheets

(56) References Cited

U.S. PATENT DOCUMENTS

2011/0277268 A1 11/2011 Okamoto
2024/0009781 A1 1/2024 Kitamura

FOREIGN PATENT DOCUMENTS

| JP | 2002190666 A | 7/2002 |
| JP | 2005236066 A | 9/2005 |
| KR | 20110125620 A | 11/2011 |
| TW | 202218792 A | 5/2022 |

OTHER PUBLICATIONS

Notice of Allowance issued on May 14, 2024 for Japanese Patent Application No. 2024-508456 and its English translation provided by Applicant's Foreign Counsel.
International Search Report mailed on Aug. 22, 2023 for International Patent Application No. PCT/JP2023/021650 and its English translation provided by WIPO.
Written Opinion of the International Searching Authority mailed on Aug. 22, 2023 for International Patent Application No. PCT/JP2023/021650 and its English translation provided by WIPO.
Office action from corresponding South Korean Patent Application No. 10-2025-7000634 dated Feb. 24, 2025 with English translation by Google Translate.

\* cited by examiner

[FIG. 4]
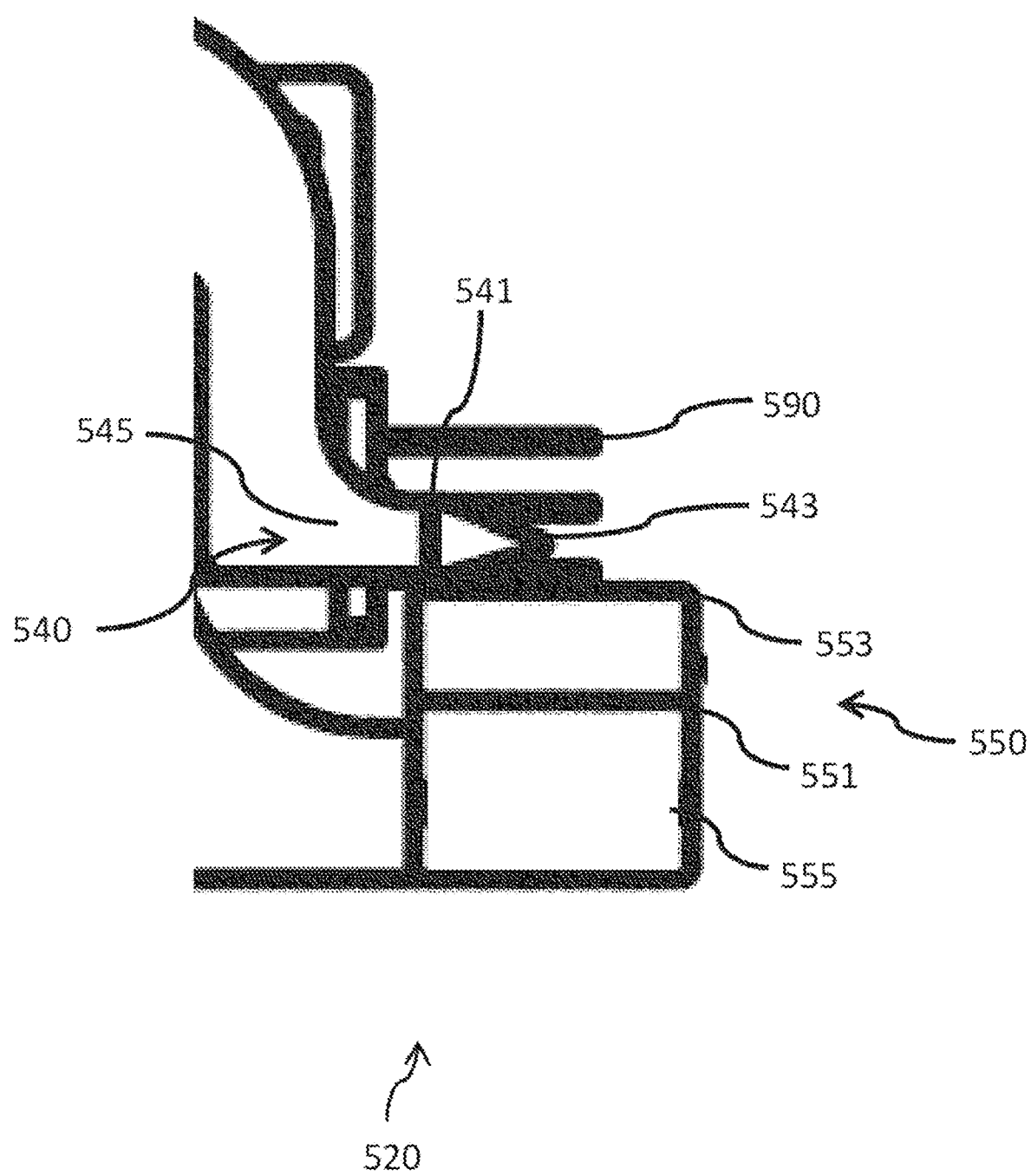

[FIG. 5]
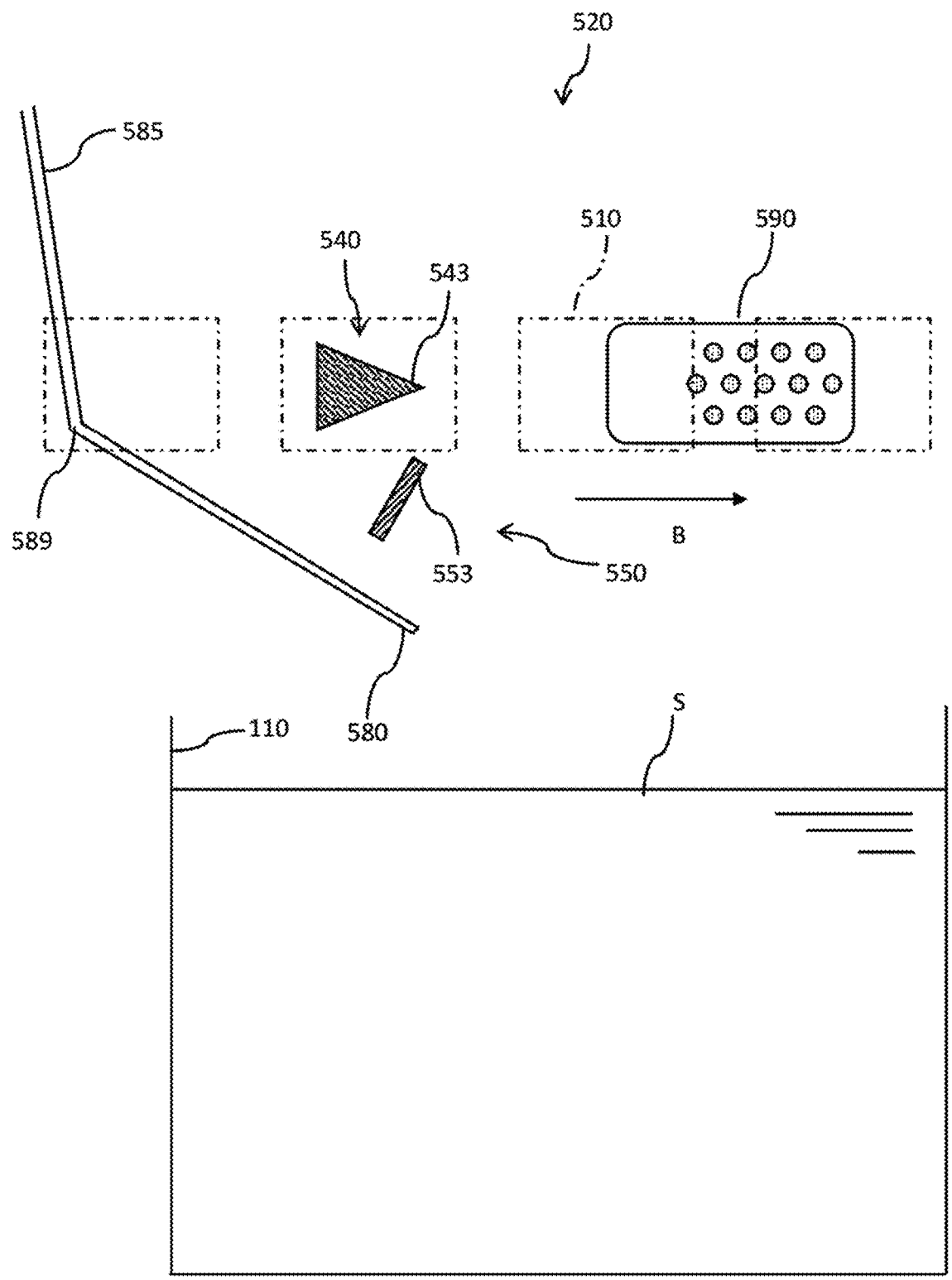

[FIG. 6]
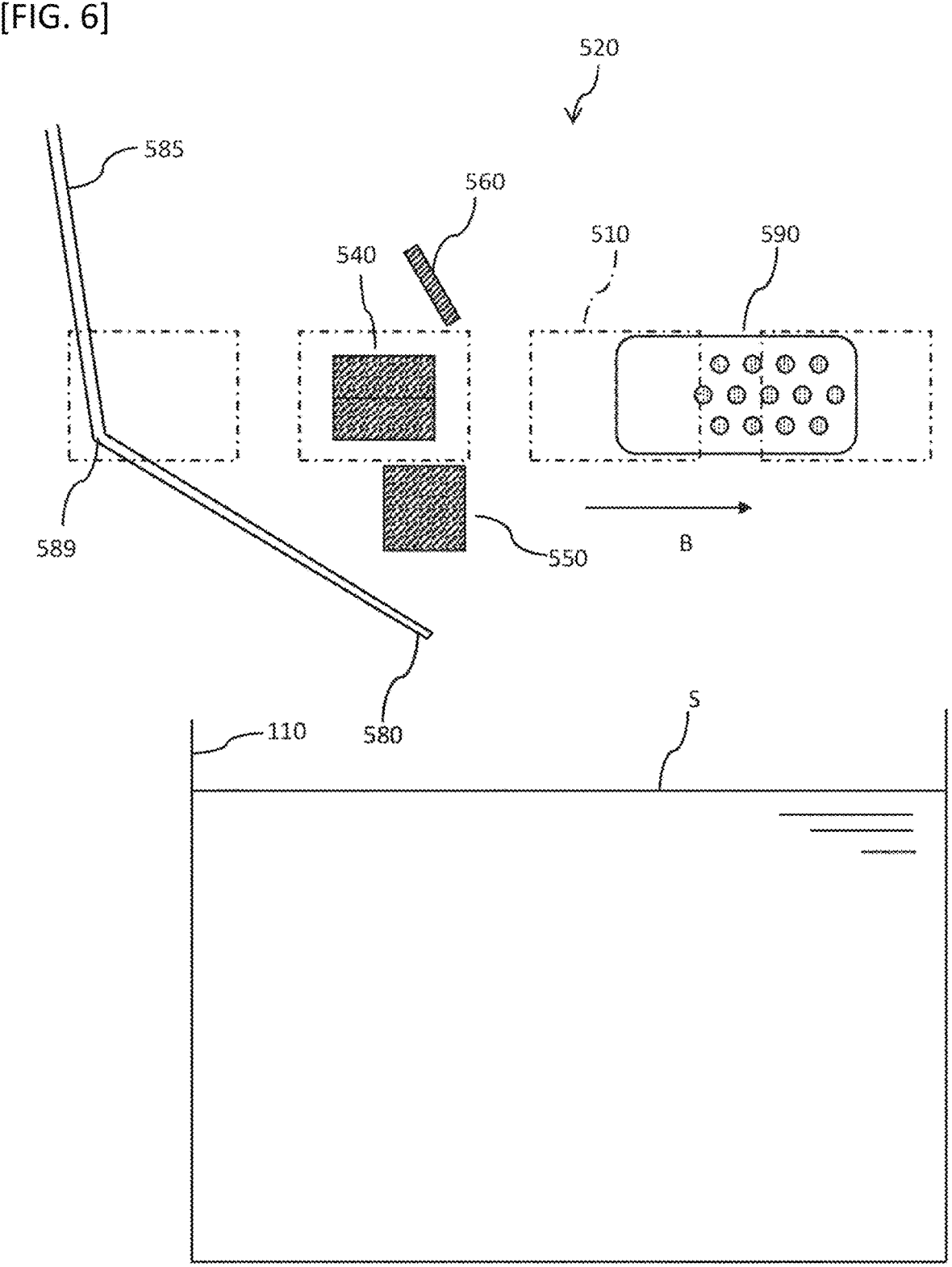

[FIG. 7]
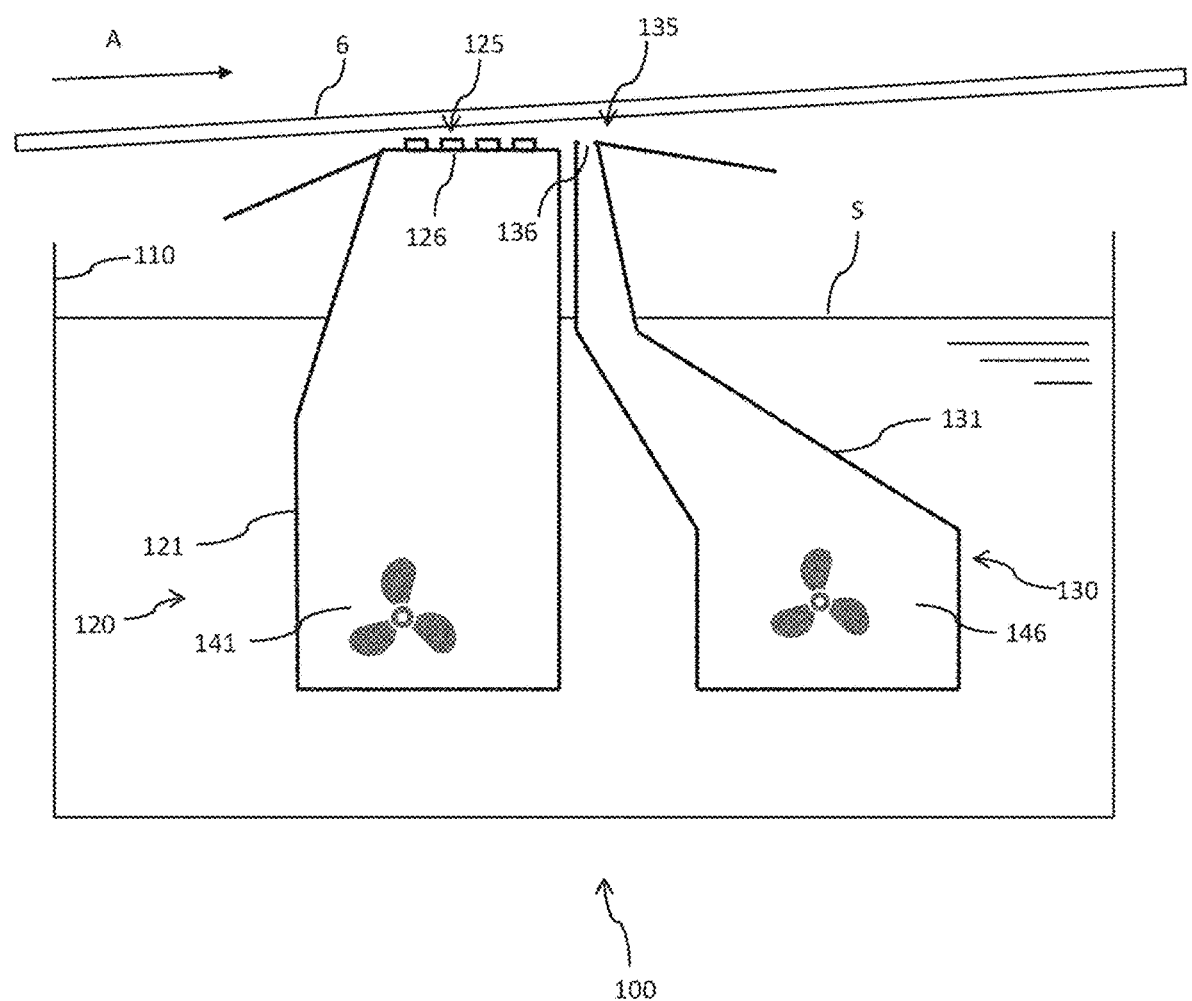

[FIG. 8]
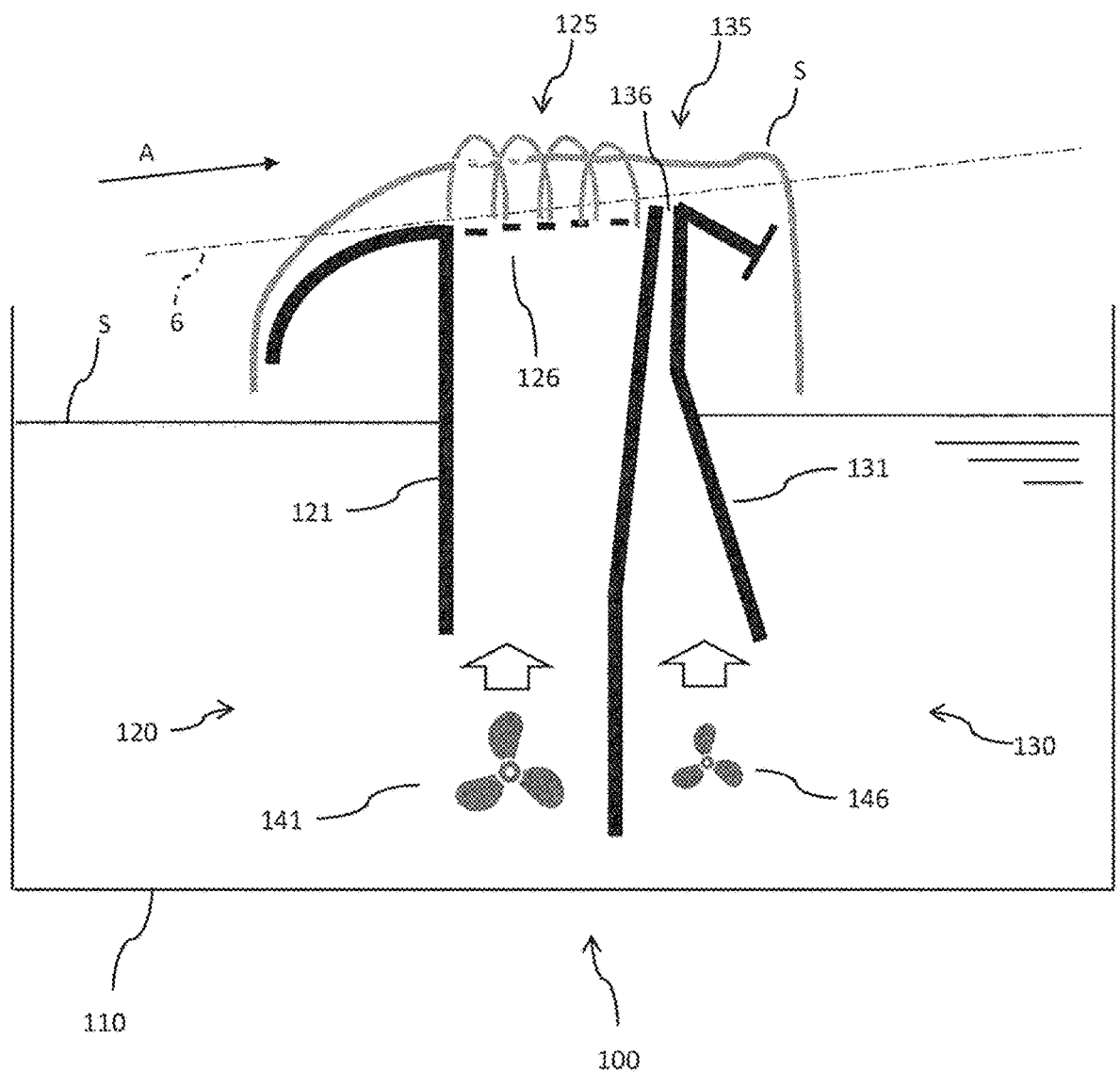

SOLDERING APPARATUS

CROSS-REFERENCE TO RELATED APPLICATIONS

The present disclosure is the U.S. national Phase of PCT Application No. PCT/JP2023/021650 filed on Jun. 12, 2023 which claims priority to Japanese Application No. 2022-094829 filed on Jun. 13, 2022, the disclosures of which are incorporated herein by reference in their entireties.

TECHNICAL FIELD

The present invention relates to a jet soldering apparatus that supplies molten solder to a substrate.

BACKGROUND ART

In related art, a plurality of conveyance claws for conveying a substrate has been used in a soldering apparatus such as a jet soldering apparatus. Molten solder jetted during soldering may be applied to the conveyance claws, the molten solder may solidify while being attached to the conveyance claws, and the solder may adhere to the conveyance claws, and thus, removal of the solder adhering to the conveyance claws has been performed in related art. JP 2002-190666 A discloses an aspect in which solder adhering to conveyance claws is removed by a removal brush as an example in related art and proposes an aspect in which the solder is removed by hot air supplied from a blowing nozzle.

SUMMARY OF INVENTION

Problem to Be Solved by Invention

Depending on a solder composition to be used in the jet soldering apparatus, adhesive force of solder is strong, and the solder adhering to a conveyance claws may not be removed by a removal brush in related art or hot air supplied from a blowing nozzle.

The present invention provides a solder removing mechanism for more reliably removing solder attached to conveyance claws.

Means for Solving Problem

Concept 1

A solder removing mechanism according to the present invention is a solder removing mechanism for removing solder from conveyance claws for conveying a substrate to which the solder is supplied,
the solder removing may comprise an abutment body that can relatively pass through recesses of the conveyance claws or below the conveyance claws.

Concept 2

In the solder removing mechanism according to concept 1,
the abutment body may have a first abutment body that can relatively pass through the recesses of the conveyance claws, and a second abutment body that can relatively pass under the conveyance claws.

Concept 3

The solder removing mechanism according to concept 1 or 2 may comprise a brush positioned on a downstream side of the abutment body in a conveyance direction of the conveyance claws.

Concept 4

In the solder removing mechanism according to any one of concepts 1 to 3,
wherein the abutment body is an abutment plate.

Concept 5

In the solder removing mechanism according to any one of concepts 1 to 4,
wherein the abutment body has a bent part, and a distal end part that extends from the bent part toward a downstream side in a moving direction of the conveyance claws.

Concept 6

The solder removing mechanism according to any one of concepts 1 to 5 may comprise a guide part that elongates below the abutment body and that guides the solder falling from the conveyance claws to a storage tank.

Concept 7

The solder removing mechanism according to any one of concepts 1 to 6 may comprise a cover that is provided on an upstream side of the abutment body in a moving direction of the conveyance claws and that extends in a vertical direction.

EFFECT OF PRESENT INVENTION

According to the present invention, a solder removing mechanism for more reliably removing solder attached to conveyance claws can be provided.

BRIEF DESCRIPTION OF FIGURES

FIG. 4 is a front view illustrating the abutment body and the brush according to the present embodiment.

FIG. 5 is a side view illustrating an example of a solder removing mechanism according to the present embodiment.

FIG. 6 is a side view illustrating another example of the solder removing mechanism according to the present embodiment.

FIG. 7 is a side view illustrating an example of a jet soldering apparatus according to the present embodiment.

FIG. 8 is a side view illustrating another example of the jet soldering apparatus according to the present embodiment.

EMBODIMENT OF THE INVENTION

Embodiment

Figure 1:
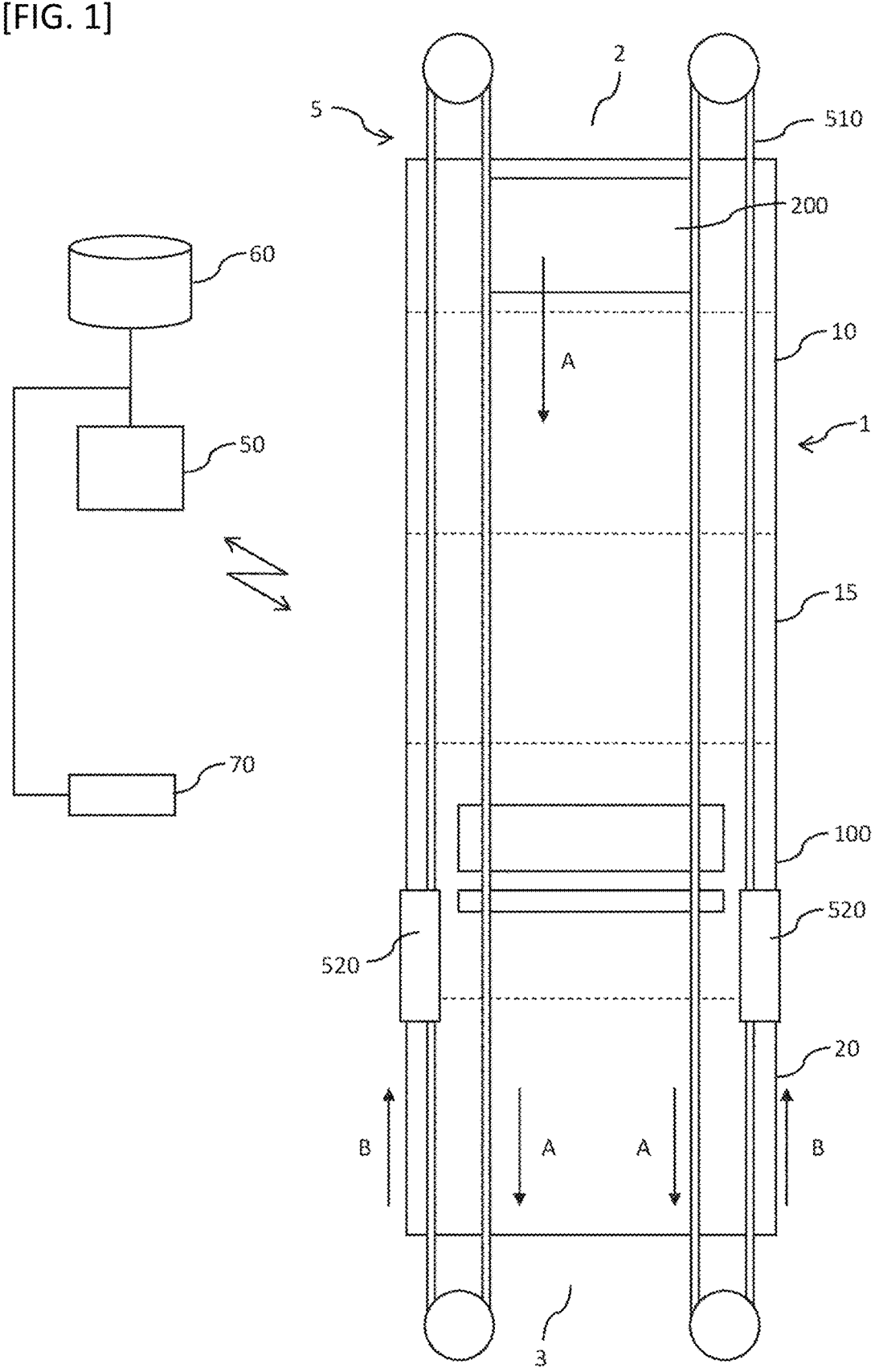
FIG. 1 is a schematic view illustrating a soldering apparatus according to the present embodiment.

A soldering apparatus illustrated in FIG. 1 is an apparatus that performs soldering processing on a substrate 200 on which electronic components such as semiconductor elements, resistors, and capacitors are mounted on a circuit. Typically, the electronic components and the like are positioned on a lower side of the substrate 200. The soldering apparatus has a main body 1 and a conveyance unit 5 that conveys the substrate 200. The main body 1 has a carry-in port 2 through which the substrate 200 is carried in and a carry-out port 3 through which the substrate 200 is carried out. The substrate 200 may be conveyed at a predetermined angle, for example, an inclination of about 3 to 6 degrees when viewed from the side (see FIGS. 7 and 8). In this case, a downstream side is positioned at a higher position than an upstream side in a substrate conveyance direction A. However, the present invention is not limited thereto, and the substrate 200 may be horizontally conveyed, for example. A conveyance unit 5 may have a conveyance rail 6 (see FIG. 7), conveyance claws 510 (see FIG. 2) movable along the conveyance rail 6 in a state of gripping a substrate 200, and a conveyance drive unit (not illustrated) that applies driving force for moving the conveyance claws 510 along the conveyance rail 6. As the conveyance rail 6, aluminum, iron, stainless steel, or the like, may be used. The conveyance claw 510 has a recess 511 for gripping the substrate 200 (see FIG. 2).

As illustrated in FIG. 1, the main body 1 may be provided with a fluxer 10 for applying flux to the substrate 200, a preheater unit 15 for preheating the substrate 200 coated with flux, a jet soldering apparatus 100 for jetting molten solder into contact with the substrate 200, and a cooler 20 for cooling the soldered substrate 200. The substrate 200 conveyed along the conveyance rail 6 of the conveyance unit 5 sequentially passes through the fluxer 10, the preheater unit 15, the jet soldering apparatus 100, and the cooler 20. Note that in FIG. 1, the soldering apparatus is illustrated in an upper plan view except for the control unit 50, the storage unit 60, and an operation unit 70 described later.

The fluxer 10 is used to apply flux to the conveyed substrate 200. The flux may include a solvent, an activator, and the like. The fluxer 10 may be provided with a plurality of coating apparatuses. The type of flux may be selectively used according to the type of solder and the type of the substrate 200.

The preheater unit 15 heats the substrate 200 to uniformly raise the substrate 200 to a predetermined temperature. When the substrate 200 is heated in this manner, the solder is easily attached to a predetermined part of the substrate 200. For example, a halogen heater is used as the preheater unit 15. The halogen heater can rapidly heat the substrate 200 to a set temperature. Furthermore. The substrate 200 may be heated by blowing gas (hot air) heated by the heater onto the substrate 200 by a fan. Furthermore, as the preheater unit 15, a far-infrared panel heater or the like may be used.

The cooler 20 has a cooling fan which is not illustrated, and cools the substrate 200 soldered by the jet soldering apparatus 100. The control of the cooling fan may be only ON and OFF, but the wind speed may be adjusted. Furthermore, as the cooler 20, a chiller or the like may be used to cool the substrate 200 to a predetermined temperature.

The control unit 50 illustrated in FIG. 1 is communicably connected to the conveyance unit 5, the fluxer 10, the preheater unit 15, the jet soldering apparatus 100, the cooler 20, the operation unit 70, and the storage unit 60. The communicable connections include both wired and wireless connections. The operation unit 70 may have a liquid crystal display panel, a numeric keypad, or the like, and is typically a personal computer, a smartphone, a tablet, a touch panel or the like. When an operator operates the operation unit 70, the control unit 50 may control a conveyance speed by the conveyance unit 5, a timing of conveying the substrate 200, a temperature of the flux at the fluxer 10, an application amount of the flux, a temperature of the preheater unit 15, a temperature of molten solder S of the jet soldering apparatus 100, a jet amount, a jet speed, ON and OFF of the cooling fan of the cooler 20, and the like. The storage unit 60 may store information input by the operation unit 70, an instruction of the control unit 50, an operating time of the jet soldering apparatus 100, and the like. The conveyance speed of the substrate 200 is about 1 to 3 cm per second for example.

Next, an example of a method of treating the substrate 200 will be described.

In a state where the substrate 200 is sandwiched between a plurality of conveyance claws 510 (see FIG. 2), the conveyance claws 510 are moved along the conveyance rail 6, whereby the substrate 200 is conveyed. The substrate 200 is carried into a main body 1 from a carry-in port 2. When the substrate 200 reaches a fluxer 10, the fluxer 10 applies flux to a predetermined portion of the substrate 200.

The conveyance claws 510 convey the substrate 200 to which the flux has been applied by the fluxer 10 to a preheater unit 15. The preheater unit 15 heats the substrate 200 to a predetermined temperature.

Next, the conveyance claws 510 convey the substrate 200 heated to the predetermined temperature by the preheater unit 15 to a jet soldering apparatus 100. The jet soldering apparatus 100 solders a predetermined portion of the substrate 200. While the jet soldering apparatus 100 is supplying molten solder S, the molten solder S supplied from a first supply port 125 and the molten solder S supplied from a second supply port 135 are mixed, and the molten solder S is supplied to above the conveyance rail 6. The molten solder S is configured not to be separated from the substrate 200 conveyed by the conveyance claws 510 between the first supply port 125 and the second supply port 135. In a state where the substrate 200 does not exist, the molten solder S supplied from the first supply port 125 pushes up the molten solder S supplied from the second supply port 135, and a plurality of convex shapes corresponding to first openings 126 are formed by the molten solder S.

Next, the conveyance claws 510 convey the soldered substrate 200 to a cooler 20. For example, a cooling fan of the cooler 20 cools the soldered substrate 200 for a predetermined period. After the substrate 200 is cooled, when the conveyance claws 510 discharge the substrate 200 from a carry-out port 3, soldering treatment to the substrate 200 is completed.

Thereafter, the conveyance claws 510 are turned back to the outside of a peripheral edge along the conveyance rail 6 and return toward the carry-in port 2. Thus, a conveyance direction A of the substrate faces an opposite direction of a conveyance direction B of the conveyance claws 510 (see FIG. 1). While the conveyance claws 510 are moving toward the carry-in port 2, the conveyance claws 510 pass through a solder removing mechanism 520. When the conveyance claws 510 pass through the solder removing mechanism 520 in this manner, the solder adhering to the conveyance claws 510 is removed by the solder removing mechanism 520. A pair of solder removing mechanisms 520 is provided so that the solder attached to each of the conveyance claws 510 gripping the substrate 200 can be removed.

When the conveyance claws 510 that have passed through the solder removing mechanism 520 return to the carry-in port 2, the conveyance claws 510 convey another substrate 200.

Typically, a large number of the plurality of conveyance claws 510 are arranged along the conveyance rail 6, and the substrate 200 is sequentially conveyed by the plurality of conveyance claws 510 which are parts of a large number of conveyance rails 6.

Next, the jet soldering apparatus 100 will be briefly described.

As illustrated in FIGS. 7 and 8, the jet soldering apparatus 100 may have a storage tank 110 for storing the molten solder S, and a supply port for supplying the molten solder S to the substrate 200. The supply port may have two types of the first supply port 125 and the second supply port 135. Then, the molten solder S may be jetted from the first supply port 125 by receiving driving force from a first pump 141 that is a first drive unit, and the molten solder S may be jetted from the second supply port 135 by receiving driving force from a second pump 146 that is a second drive unit.

The molten solder S jetted from the first supply port 125 and the second supply port 135 is jetted upward from below. The molten solder S having received the driving force from the first pump 141 is pressure-fed in a duct and jetted toward the substrate 200 to attach the solder to a predetermined portion of the substrate 200. Similarly, the molten solder S having received the driving force from the second pump 146 is pressure-fed in a duct and jetted toward the substrate 200 to attach the solder to a predetermined portion of the substrate 200.

The first supply port 125 of the jet soldering apparatus 100 has a plurality of first openings 126, and the first openings 126 constitute a primary jet nozzle. The plurality of first openings 126 are used to vigorously supply a large amount of molten solder S to the substrate 200. A second opening 136 of the second supply port 135 is a secondary jet nozzle, and is used to supply the molten solder S to the substrate 200 with weaker force than the first supply port 125. The jet solder supplied from the first supply port 125 is a dynamic supply for vigorously colliding the molten solder S against the substrate 200, and is a supply for spreading the molten solder S to every corner of the substrate 200. On the other hand, the jet solder supplied from the second supply port 135 is a static supply, and is a supply for cleanly attaching the solder to an electrode or the like of the substrate 200 by passing the jet solder through the molten solder S having a gentle flow. The configuration of the jet soldering apparatus and conditions such as a force of the jet of the molten solder are examples, and the present application is not limited to the above configuration.

A first supply unit 120 has a first housing 121 and the first supply port 125 provided on an upper surface of the first housing 121 and having one or the plurality of first openings 126 for supplying the molten solder S. The first opening 126 may be provided so as to protrude upward from the upper surface of the first housing 121. A second supply unit 130 has a second housing 131 and the second supply port 135 provided on an upper surface of the second housing 131 and having one or a plurality of the second openings 136 for supplying the molten solder S. The first housing 121 and the second housing 131 may be provided apart from each other (see FIG. 7), but they may be provided integrally (see FIG. 8). In a case where the first housing 121 and the second housing 131 are integrated, a part of the wall surface may be shared.

An aspect may be adopted in which no opening or gap through which the molten solder S falls downward is provided between the first supply port 125 and the second supply port 135 on an upper surface of the first housing 121 and the second housing 131 along the substrate conveyance direction A. When an opening or a gap through which the molten solder S falls downward is provided, a surface area where the molten solder S comes into contact with oxygen increases, and an oxide is generated. On the other hand, in a case of adopting an aspect in which a part where the molten solder S falls, such as an opening or a gap, is not provided between the first supply port 125 and the second supply port 135 along the substrate conveyance direction A as in the present aspect, the molten solder S does not fall between the first supply port 125 and the second supply port 135 along the substrate conveyance direction A, so that generation of an oxide of the molten solder S can be prevented.

Next, the solder removing mechanism 520 will be described.

Figure 2:
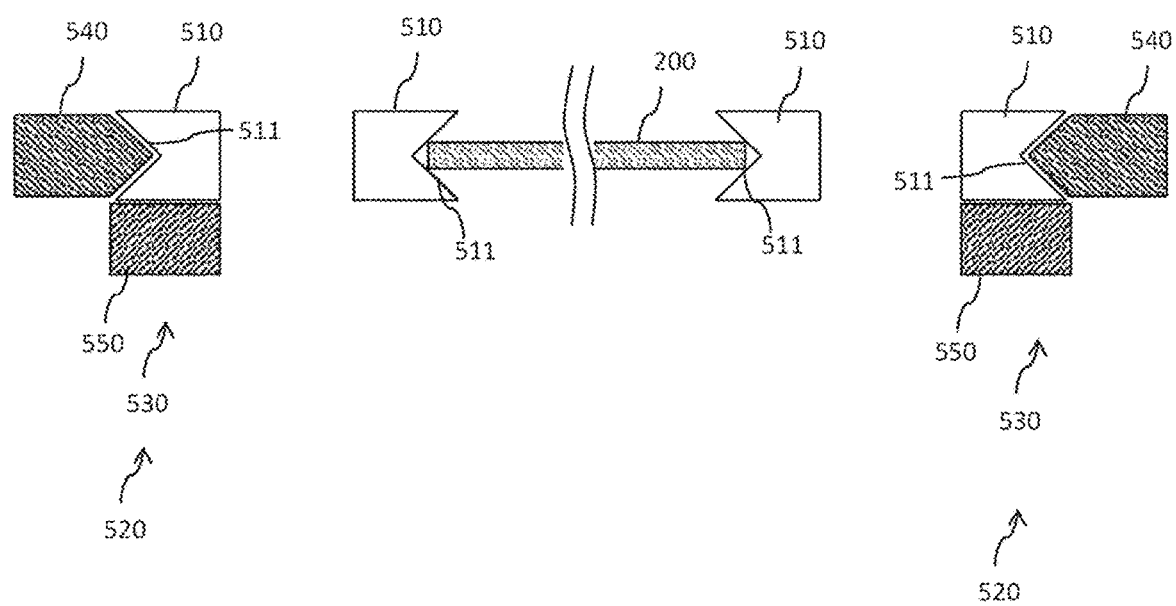
FIG. 2 is a longitudinal sectional view illustrating a relationship between a conveyance claw and an abutment body according to the present embodiment.

As illustrated in FIG. 2, the solder removing mechanism 520 of the present embodiment has an abutment body 530 that can relatively pass through recesses 511 of the moving conveyance claws 510 or below the moving conveyance claws 510 after the substrate 200 is removed from the conveyance claws 510 and conveyed. In FIG. 2, the conveyance claws 510 gripping the substrate 200 move toward a front surface side of a paper surface, but the conveyance claws 510 not gripping the substrate 200 illustrated on the left and right sides of FIG. 2 move toward a back surface side of the paper surface. In the present application, "can pass" means can relatively pass. Typically, in a state where the conveyance claws 510 move and the abutment body 530 is stopped, the conveyance claws 510 pass through the abutment body 530, so that the abutment body 530 relatively passes through the recesses 511 of the moving conveyance claws 510 or below the moving conveyance claws 510.

The abutment body 530 abuts on the cured solder attached to the conveyance claws 510 to remove the solder. By adopting such an abutment body 530, the solder attached to the conveyance claws 510 and cured can be more reliably scraped off. When only a brush is used as in the related art, the solder firmly attached to the conveyance claws 510 may not be scraped off. In this regard, by adopting the abutment body 530 as in the present embodiment, it is possible to prevent occurrence of such a situation. In particular, in the case of specific solder such as Sn-58Bi (Bi: 58 mass %, remaining part: Sn), the solder tends to firmly adhere to the conveyance claws 510, and thus it is advantageous to provide the abutment body 530 as in the present embodiment. More specifically, adhesive force of Sn—Bi solder such as Sn-58Bi is much stronger than an SAC (Sn—Ag—Cu) composition, and a brush 590 in the related art may not remove the adhered solder. In this regard, by adopting the aspect of the present embodiment, the Sn—Bi solder having strong adhesion force can be more reliably scraped off. In addition, an amount of the Sn—Bi solder attached to the conveyance claws 510 is larger than that of the SAC composition, and thus, an amount of solder to be scraped off is larger. For this reason, in a case where the brush 590 in the related art is adopted, clogging, or the like, is also concerned. On the other hand, according to the aspect of the present embodiment, there is no element in which the solder scraped off is entangled in the removal mechanism as in the case of adopting the brush 590, and thus, such a concern can also be reduced. The solder having strong adhesion force is not limited to the Sn—Bi solder, and the present embodiment can exhibit the effect even in another solder composition having strong adhesion force such as the Sn—Sb solder.

A pair of the conveyance claws 510 sandwiching the substrate 200 is provided, and thus, a pair of abutment bodies 530 may also be provided. As illustrated in FIGS. 5 and 6, at least part of the solder removing mechanism 520 may be located above the storage tank 110 of the jet solder apparatus. By providing the solder removing mechanism 520 above the storage tank 110 of the jet solder apparatus, the solder scraped off from the conveyance claws 510 can be directly dropped into the storage tank 110 and reused for soldering, and accumulation of the scraped solder in the jet soldering apparatus 100 can be prevented. The conveyance claw 510 may be made of resin or metal, and when made of metal, may be made of stainless steel such as SUS.

As illustrated in FIGS. 2, 5, and 6, the abutment body 530 may have a first abutment body 540 that can relatively pass through the recesses 511 of the moving conveyance claws 510 and can abut on the cured solder attached to the recesses 511 of the conveyance claws 510, and a second abutment body 550 that can relatively pass under the moving conveyance claws 510 and can abut on the cured solder attached to a lower side of the conveyance claws 510. The first abutment body 540 may have a shape slightly smaller than the recess 511 and matching a shape of the recess 511. The first abutment body 540 may have a shape similar to the shape of the recess 511. As described above, the first abutment body 540 is smaller than the recess 511 and has a shape matching the shape of the recess 511, so that the solder attached to the recess 511 can be more reliably removed.

Figure 3:
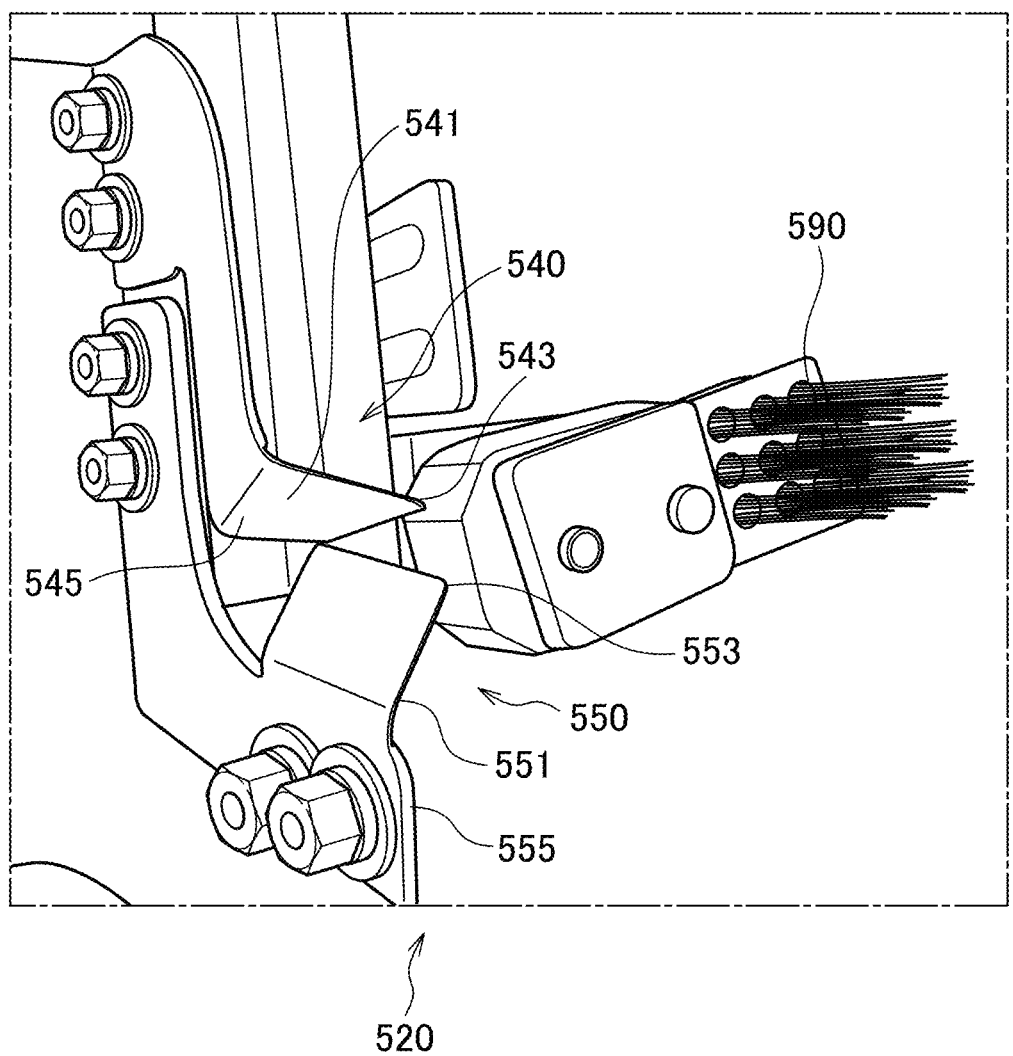
FIG. 3 is a photograph indicating the abutment body and a brush according to the present embodiment.

As illustrated in FIGS. 3 and 4, the first abutment body 540 may be an abutment plate. The first abutment body 540 may have a first proximal end part 545, a first distal end part 543, and a first bent part 541 provided between the first proximal end part 545 and the first distal end part 543. The first distal end part 543 may extend toward a downstream side (the right side in FIG. 3) in the moving direction B of the conveyance claw 510 with reference to the first bent part 541. When the first abutment body 540 is linear without the first bent part 541 (although the first abutment body 540 is basically configured not to abut on the conveyance claws 510), there is a possibility that the first abutment body 540 is caught by the conveyance claws 510 for some reason and the movement of the conveyance claws 510 is stopped. On the other hand, with the configuration in which the first distal end part 543 extends toward the downstream side in the moving direction B of the conveyance claw 510 as in the present aspect, even if the first distal end part 543 of the first abutment body 540 abuts on the conveyance claws 510 for some reason, it is possible to reduce a possibility that the first abutment body 540 is caught by the conveyance claw 510 and the movement of the conveyance claws 510 is stopped. If the movement of the conveyance claws 510 is stopped, the treatment itself on the substrate 200 is stopped, but by adopting this aspect, it is possible to prevent such a circumstance. Note that the first distal end part 543 extends toward the inside of the soldering apparatus, and in FIG. 2, the first distal end part 543 of the first abutment body 540 on the right side extends toward the left side, and the first distal end part 543 of the first abutment body 540 on the left side extends toward the right side.

Similarly to the first abutment body 540, the second abutment body 550 may also be formed of an abutment plate. As illustrated in FIGS. 3 and 4, the second abutment body 550 may have a second proximal end part 555, a second distal end part 553, and a second bent part 551 provided between the second proximal end part 555 and the second distal end part 553. The second distal end part 553 may extend toward the downstream side (the right side in FIG. 3) in the moving direction B of the conveyance claw 510 with reference to the second bent part 551. For the same reason as described for the first abutment body 540, the second distal end part 553 is configured to extend toward the downstream side in the moving direction B of the conveyance claw 510 as described above, whereby the second abutment body 550 can be prevented from being caught by the conveyance claws 510. In other words, although the second abutment body 550 is basically configured not to abut on the conveyance claws 510, even if the second abutment body 550 abuts on the conveyance claws 510 for some reason, the second abutment body 550 can be prevented from hindering the movement of the conveyance claws 510. Note that in a similar manner to the first distal end part 543, the second distal end part 553 also extends toward the inside of the soldering apparatus.

The abutment body 530 may be made of metal, or may be made of stainless steel such as SUS or iron. However, stainless steel is preferable from the viewpoint that rust is hardly generated. Only a pair of the first abutment body 540 and the second abutment body 550 may be provided in the soldering apparatus, or a plurality of pairs thereof may be provided.

As illustrated in FIGS. 5 and 6, a guide part 580 may be provided below the abutment body 530 to guide the solid solder falling from the conveyance claws 510 to the storage tank 110 of the jet solder apparatus. By providing such a guide part 580, it is possible to more reliably guide the solder which abuts on the abutment body 530 and is scraped off to the storage tank 110, and it is possible to melt and reuse the solder. Further, it is also possible to more reliably prevent the solder scraped off from accumulating in the jet soldering apparatus 100. In particular, an amount of adhesion to the conveyance claws 510 is large in specific solder such as Sn—Bi solder, and thus, adopting such an aspect is very useful from both the viewpoint of reuse and the viewpoint of preventing accumulation of the scraped solder in the jet soldering apparatus 100.

A cover 585 that is positioned on the downstream side (the left side in FIGS. 5 and 6) in the moving direction B of the conveyance claws 510 and extends in the vertical direction may be provided. According to the study of the inventors of the present application, the solder scraped off from the conveyance claws 510 tends to splash to the upstream side in the moving direction B (the left side in FIGS. 5 and 6). However, by providing such a cover 585, it is possible to prevent the solder scraped off by coming into contact with the abutment body 530 from splashing to the upstream side in the moving direction B of the conveyance claws 510 (the left side in FIGS. 5 and 6). In the present embodiment, an aspect is adopted in which the cover 585 and the guide part 580 are integrated, and these are connected via a connecting part 589, but the present invention is not limited to such an aspect, and the cover 585 and the guide part 580 may be separated. However, in a case where the cover 585 and the guide part 580 are integrated as in the present aspect, it is advantageous in that the solid solder colliding with the cover 585 can be directly guided to the storage tank 110 by the guide part 580.

A brush 590 positioned on the downstream side (the right side in FIGS. 5 and 6) of the conveyance direction B of the conveyance claws 510 with respect to the abutment body 530 may be provided. By providing such a brush 590, the solder adhering to the conveyance claws 510 can be more reliably removed. In other words, even if the solder attached to the conveyance claws 510 can be scraped by the abutment body 530 made of a metal plate, or the like, the scraped solder may be placed on the conveyance claws 510. In this regard, by providing the brush 590 as in the present aspect, the solder placed on the conveyance claws 510 can be dropped. Here, in a case where the brush 590 is made of metal, it is advantageous in that the effect is also enhanced. However, the material of the brush 590 is not particularly limited, and the brush 590 may be, for example, made of horse bristles. In a case where the brush 590 is made of metal, stainless steel such as SUS or iron may be used. However, stainless steel is preferable from the viewpoint that rust is hardly generated. As illustrated in FIG. 3, the abutment body 530 and the brush 590 may be integrally configured.

The abutment body 530 may have a third abutment body 560 that abuts on the solder attached above the conveyance claws 510 (see FIG. 6). Although the solder usually does not adhere to an upper side of the conveyance claws 510, the third abutment body 560 may be provided because the solder may adhere for some reason. Similarly to the first abutment body 540 and the second abutment body 550, the third abutment body 560 may also be configured such that a distal end side of the third abutment body 560 extends toward the downstream side (the right side in FIG. 6) in the conveyance direction B of the conveyance claws 510.

The description of each embodiment and the disclosure of the drawings described above are merely examples for describing the invention described in the claims, and the invention described in the claims is not limited by the description of each embodiment or the disclosure of the drawings described above. In addition, the description of the claims as originally filed is merely an example, and the description of the claims can be appropriately changed based on the description of the specification, the drawings, and the like.

Reference Signs List 110 storage tank
200 substrate
510 conveyance claw
511 recess
520 solder removing mechanism
530 abutment body
540 first abutment body
541 first bent part
543 first distal end part
550 second abutment body
551 second bent part
553 second distal end part
580 guide part
585 cover
590 brush

The invention claimed is:

1. A soldering apparatus comprising:
a conveyance unit having conveyance claws for gripping and conveying a substrate, the conveyance claws moving along a conveyance rail;
a supply unit for supplying molten solder to the substrate being conveyed by the conveyance claws of the conveyance unit; and
a solder removing mechanism for removing solder from the conveyance claws after conveying the substrate soldered with the molten solder supplied from the supply unit,
wherein the solder removing mechanism comprises an abutment plate that is configured to relatively pass through recesses of the conveyance claws or below the conveyance claws,
wherein the abutment plate comprises a base end part, a distal end part that extends downstream in a direction of movement of the conveyance claws along the conveyance rail, and a bent part between the base end and the distal end part, and
wherein the distal end part is located downstream of the bent part in the direction of movement of the conveyance claws along the conveyance rail and the distal end part extends downstream in the direction of movement of the conveyance claws.

2. The soldering apparatus according to claim 1, wherein the abutment plate has a first abutment plate that is configured to relatively pass through the recesses of the conveyance claws, and a second abutment plate that is configured to relatively pass under the conveyance claws.

3. The soldering apparatus according to claim 1 comprising a brush positioned on a downstream side of the abutment plate in a conveyance direction of the conveyance claws.

4. The soldering apparatus according to claim 1 comprising a guide part that elongates below the abutment plate and that guides the solder falling from the conveyance claws to a storage tank.

5. The soldering apparatus according to claim 1 comprising a cover that is provided on an upstream side of the abutment plate in a moving direction of the conveyance claws and that extends in a vertical direction.

* * * * *